United States Patent [19]

Ostwald

[11] 4,224,791
[45] Sep. 30, 1980

[54] ARRANGEMENT FOR GENERATING AND MAKING AVAILABLE A VACUUM FOR VEHICULAR AUXILIARY POWER SYSTEMS

[75] Inventor: Fritz Ostwald, Buchschlag, Fed. Rep. of Germany

[73] Assignee: ITT Industries, Inc., New York, N.Y.

[21] Appl. No.: 21,411

[22] Filed: Mar. 19, 1979

[30] Foreign Application Priority Data

Apr. 4, 1978 [DE] Fed. Rep. of Germany ....... 2814384

[51] Int. Cl.³ .......................................... B60K 41/20
[52] U.S. Cl. ..................................... 60/397; 60/411; 192/3 R; 192/3 M
[58] Field of Search ............... 192/3 R, 3 M; 60/397, 60/411

[56] References Cited
U.S. PATENT DOCUMENTS

| | | | |
|---|---|---|---|
| 3,792,760 | 2/1974 | Haas | 192/3 R |
| 3,792,761 | 2/1974 | Ball et al. | 192/3 M X |
| 3,792,762 | 2/1974 | Ball et al. | 192/3 M X |

Primary Examiner—Irwin C. Cohen
Attorney, Agent, or Firm—John T. O'Halloran; Alfred C. Hill

[57] ABSTRACT

An arrangement for generating and making available a vacuum for an auxiliary power system of a vehicle, such as a brake booster, comprises a throttle disposed in the intake system of an internal combustion engine between the carburetor and the engine, a vacuum conduit having one end connected to the auxiliary power system and the other end connected to the intake system between the throttle and the engine, a first sensor coupled to the conduit produces a first response when the vacuum has achieved at least a predetermined value, at least one second sensor responding to at least one other operating state of either the engine or the vehicle to produce a second response dependent on the operating state, and a control arrangement coupled to the first and second sensors and the throttle to control the throttle in response to the first and second responses.

9 Claims, 3 Drawing Figures

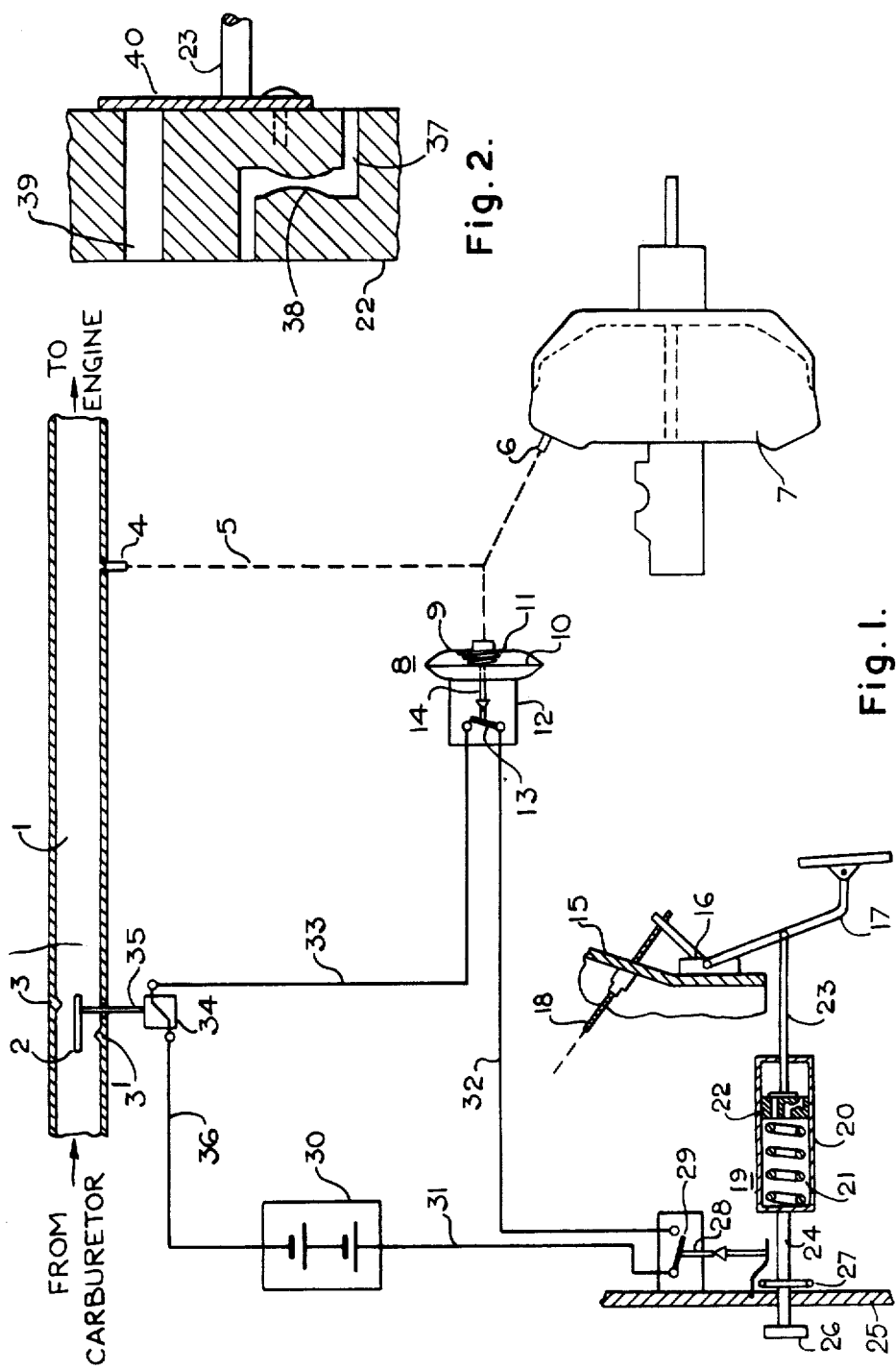

ARRANGEMENT FOR GENERATING AND MAKING AVAILABLE A VACUUM FOR VEHICULAR AUXILIARY POWER SYSTEMS

BACKGROUND OF THE INVENTION

The present invention relates to vehicular auxiliary power systems, such as brake boosters in which the pressure difference between a vacuum and atmospheric pressure is utilized, and more particularly to an arrangement for generating and making available a vacuum in such vehicular auxiliary power systems.

U.S. Pat. No. 3,792,761 describes an arrangement for the generation of vacuum in a brake booster, wherein one chamber of the brake booster is connected to an engine intake system pipe by means of a vacuum conduit. In this arrangement, the brake booster conventionally includes a casing having a diaphragm disposed therein, a piston rod to which the diaphragm is fastened, and a piston return spring. An additional throttle blade, which is actuated by a vacuum switch, is positioned in the air intake pipe of an air filter. The vacuum switch is connected to the brake booster's second chamber, which is pressurized at atmospheric pressure during braking, through a vacuum conduit.

As the brake pedal is depressed, the connecting channel between the two chambers of the brake booster is closed as a result of the displacement of the piston rod. As the piston rod continues its movement, the second chamber is connected to atmosphere, with atmospheric pressure acting on the diaphragm on this side. This causes movement of the diaphragm in opposition to the biasing force of the piston return spring. Concurrently with the pressure increase in the second chamber, the pressure in the vacuum switch is likewise increased, the switch thereby causing closing of the additional throttle blade in the air filter—independent of the position of the carburetor throttle. This results in a boosted vacuum in the engine intake system and, accordingly, in the first chamber of the brake booster. To prevent stopping of the engine, the additional throttle blade includes openings through which the volume of air necessary for idle engine operation is passed into the carburetor.

Normally, the carburetor throttle is so adjusted that the engine reaches its idling speed with the accelerator pedal in the inactive position. On depression of the brake pedal, the additional throttle blade is closed additionally, which is, however, to allow the passage of an amount of air sufficient for idle engine operation. The additional throttle blade remains closed as long as the brake pedal is depressed. The additional throttle blade serves to generate the vacuum only if for some reason the operability of the carburetor's throttle is impaired or if the accelerator pedal and the brake pedal are depressed at the same time. It is not possible to design the additional throttle blade in such a manner that its throttling effect goes beyond that of the carburetor throttle. This would be an offense against many countries' exhaust regulations and would result in an engine stop because of insufficient supply of air. In the event of the carburetor throttle not functioning normally, for example, because of a defect, the arrangement of the additional throttle blade will be an advantage because otherwise it would not be possible to boost the vacuum. The additional throttle blade is, however, only closed on commencement of the braking operation whereupon a sufficient amount of vacuum is generated. The vacuum should, however, be available in the brake booster at the time the braking operation is started to avoid a reduction in the booster effect in the initial phase of the braking operation. Moreover, the additional throttle blade cannot be used to generate a vacuum greater than that produced with the carburetor throttle intact.

SUMMARY OF THE INVENTION

It is, therefore, an object of this invention to provide an arrangement for generating and making available a vacuum in vehicular auxiliary power systems of the type identified hereinabove which avoids the shortcomings of known devices and ensures the presence of a large amount of vacuum in the brake booster prior to the commencement of the braking operation.

A feature of the present invention is the provision of an arrangement for generating and making available a vacuum for an auxiliary power system of a vehicle comprising: at least one throttle disposed in an intake system of an internal combustion engine: a vacuum conduit having one end connected to the auxiliary power system and the other end connected to the intake system between the throttle and the engine; first means coupled to the conduit to produce a first response when the vacuum has achieved at least a predetermined value; second means coupled to respond to at least one other operating state of one of the engine and the vehicle and to produce a second response dependent on the operating state; and third means coupled to the first and second means and the throttle to control the throttle in response to the first and second responses.

The essential advantages of the subject matter of this invention are:

(a) the closing of the throttle blade occurs only in such operating states of the engine and/or vehicle in which the throttling function does not adversely affect the running of the engine or of the vehicle;

(b) the engine intake pipe is closed by the throttle blade completely for only a short time;

(c) the amount of vacuum produced is greater than in known arrangements;

(d) in brake boosters the vacuum is made available prior to the commencement of the braking operation; and (e) the arrangement is adapted for use in both Otto engines and Diesel engines.

The throttle is preferably positioned between the carburetor and the engine. This arrangement has the advantage that the vacuum does not affect the carburetor.

In an advantageous improvement of the subject matter of this invention, third means are provided to detect and process the signals and to control the throttle's final control element. This arrangement enables a larger number of engine and vehicle-related parameters to be evaluated and permits utilization of those operating states that are most favorable for vacuum generation. It is an advantage that the first and second means deliver electrical signals and that the third means comprises at least one electronic circuit. This permits a simple and safe transmission of any measured value and its speedy evaluation in a low-cost and space-saving control unit. In the event that an electronic circuit is used, a solenoid-operated final control element of the throttle is particularly suitable. Preferably, the second means is at least suitable for detecting the engine's revolutions and/or acceleration because throttling of the engine is extremely disadvantageous in specific operating states.

Such operating states are present, for example, when the engine is running at idling speed or during acceleration. A particularly suitable point of time for generation of the vacuum prevails during coasting of the vehicle, i.e., when the kinetic energy of the vehicle is greater than the engine torque. This case occurs in particular when the accelerator pedal is released quickly. It is, therefore, an advantage to have the second means detect the accelerator lever return speed.

In a particularly suitable arrangement for detecting the accelerator lever return speed, there is provided a liquid-filled cylinder, a spring disposed therein, and a piston, with the piston being mechanically and rigidly connected with the accelerator lever and having the spring acting on the piston in the direction towards the accelerator lever. There is further included in the liquid-filled cylinder a throttle valve and a check valve allowing passage of the liquid during forward movements of the accelerator pedal. Because of the low costs of the control elements, it would be suitable in some cases that the means for detecting and processing the signals as well as for controlling the throttle's final control element comprise at least one fluidic control element.

BRIEF DESCRIPTION OF THE DRAWING

Above-mentioned and other features and objects of this invention will become more apparent by reference to the following description taken in conjunction with the accompanying drawing, in which:

FIG. 1 is a schematic representation of the arrangement for controlling the vacuum in a brake booster in accordance with the principles of the present invention including an arrangement for detecting the accelerator lever return speed;

FIG. 2 is a cross-section of the piston in the arrangement for detecting the accelerator lever return speed of FIG. 1.

DESCRIPTION OF THE PREFERRED EMBODIMENTS

Figure 3:
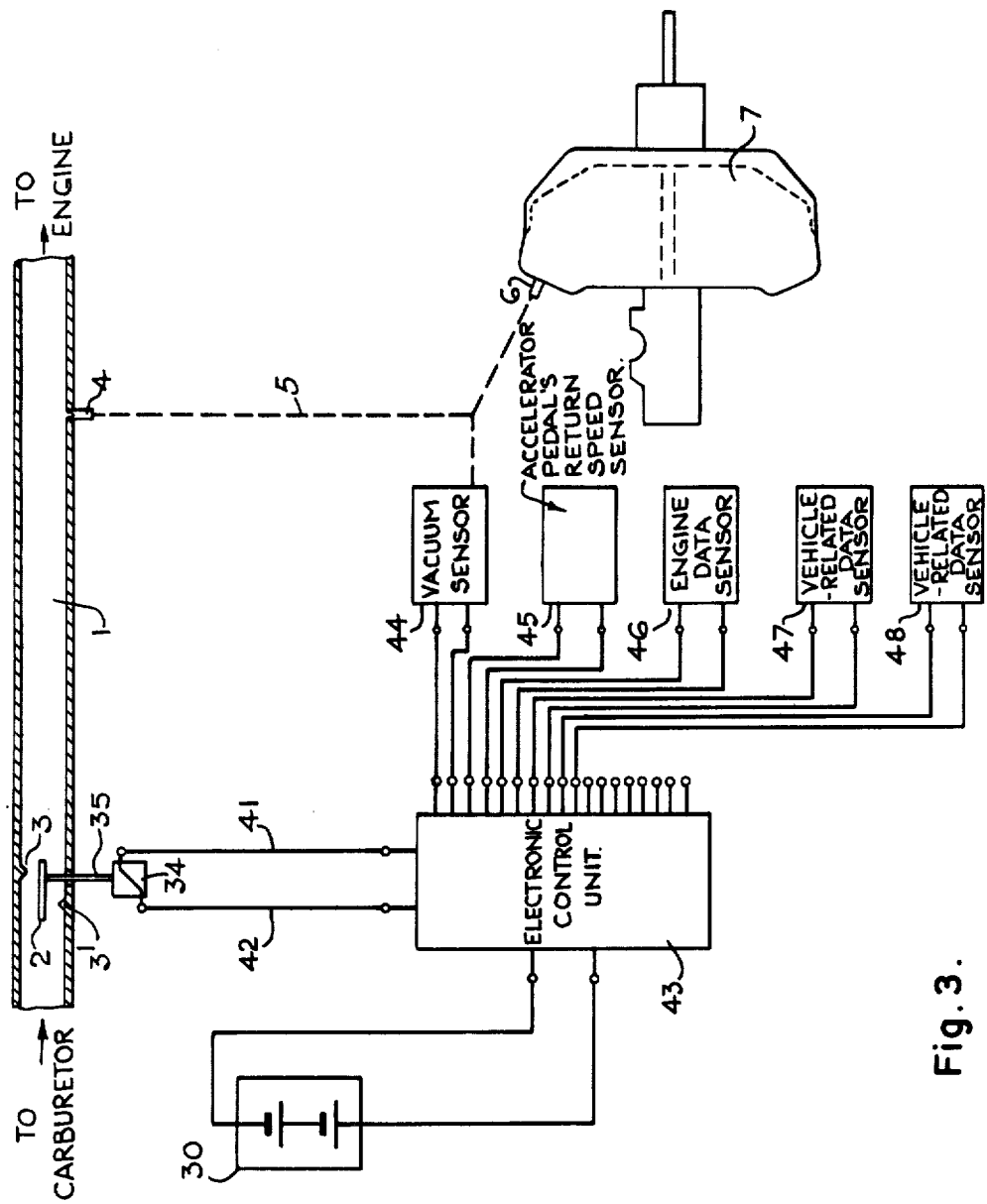
FIG. 3 is an arrangement according to FIG. 1 in which the signals are input into an electronic computer which computer controls the throttle's final control element dependent on the input signals.

In FIG. 1, a pipe 1 of an engine induction or input system includes a pivoted throttle blade 2 which is coaxial with pipe 1 in its first position and abuts against stops 3 and 3' in pipe 1 in its second position. Between throttle blade 2 and an engine (not shown in the drawing), pipe 1 includes a port 4 for a vacuum conduit 5 whose opposite end is connected to a port 6 of a brake booster 7. Vacuum conduit 5 is also connected to a diaphragm switch 8. Diaphragm switch 8 comprises a vacuum housing 9 with a diaphragm 10 which is acted upon by a spring 11, and a switch housing 12 including an electric make contact 13 which is actuated by diaphragm 10 through a pin 14.

A pedal support 16 of an accelerator lever 17 is secured to a splashboard 15. Accelerator lever 17 actuates a Bowden cable 18 in the known manner. In addition, accelerator lever 17 operates a device 19 to detect the accelerator lever return speed and to deliver an electrical signal provided the accelerator lever return speed attains a predetermined value. Device 19 comprises a fluid-filled cylinder 20 with a pressure spring 21 and a piston 22. At its front end close to accelerator lever 17, cylinder 20 includes a bore through which a rod 23, which is fastened to piston 22 and to accelerator lever 17, extends, the rod being sealed relative to cylinder 20. Spring 21 is arranged in cylinder 20 on the side of piston 22 remote from accelerator lever 17. Fastened to the side of cylinder 20 remote from accelerator lever 17 is a rod 24 which is guided in a bore in a wall 25 and provided with two stops 26 and 27. Stop 27 actuates an electrical make contact 29 through a pin 28.

A terminal of an electrical power source 30 is connected to make contact 29 through a line 31, and the other side of make contact 29 is connected to make contact 13 through a line 32. The other side of make contact 13 is connected to a line 33 leading to a coil of a solenoid-operated final control element 34 which acts on throttle blade 2 through a pin 35. The other coil end connects with a second terminal of electric power source 30 through a line 36.

FIG. 2 shows a cross-section of piston 22. Piston 22 has an opening 37 extending from one end to the other end and including a throttle valve 38 in its middle portion. A bore 39 parallel to and spaced from the axis of cylinder 20 extends likewise across the whole width of piston 22. At the end of piston 22 to which rod 23 is secured, a spring plate 40 covering bore 39 is disposed and fastened on one end in such a manner that closing or opening of bore 39 occurs dependent on the direction of liquid flow in bore 39.

The mode of operation of the device illustrated in FIGS. 1 and 2 is described as follows:

With the engine in operation, a vacuum is produced in pipe 1 of the engine induction system, the magnitude of the vacuum being dependent on the engine speed and the position of a carburetor throttle blade not shown. Because pipe 1 is connected to brake booster 7 through vacuum conduit 5, the vacuum prevailing in brake booster 7 is always the same as in pipe 1. In addition, diaphragm switch 8 is connected to vacuum conduit 5, with the vacuum prevailing in the switch's vacuum housing 9 being the same as in pipe 1. As a result, diaphragm 10 is held against the resilient force of spring 11, and make contact 13 connected with diaphragm 10 through pin 14 is broken. On depression of the accelerator pedal, piston 22, which is connected with accelerator lever 17 through rod 23, is moved in cylinder 20 against spring 21. Since liquid-filled cylinder 20 bears upon wall 25 through rod 24 and stop 27 and is unable to be displaced relative to wall 25, a pressure above atmosphere develops on the side of piston 22 on which spring 21 bears which pressure decays, however, rapidly because the major part of the liquid flows through bore 39 and spring plate 40 is lifted off bore 39. A small amount of liquid flows through opening 37 incorporating throttle valve 38.

When the operator lifts his foot off the accelerator pedal, accelerator lever 17 returns to its rest position. Rod 23 and piston 22, which are rigidly connected with accelerator lever 17, follow this movement. The liquid contained in the chamber of cylinder 20 close to accelerator lever 17 is thereby compressed. Since bore 39 is closed by spring plate 40, pressure compensation can only occur through opening 37 incorporating throttle valve 38. It depends on the size of throttle valve 38 how long it takes to achieve pressure compensation. Thus, throttle valve 38 determines the threshold value for detecting the accelerator lever return speed. Therefore, depending on the size of throttle bore 38, the strength of spring 21 and the position of piston 22 in cylinder 20, the pressure in the chamber of cylinder 20 close to accelerator lever 17 is for a time higher than the force of spring 21, as a consequence of which the whole cylinder 20 and rod 24 are moved in the direction towards accelerator lever 17. The travel of the cylinder is limited by stop 26. As a result of the displacement of cylinder 20 and rod 24, stop 27 actuates, via pin 28, make contact 29, thereby connecting lines 31 and 32.

If the vacuum in brake booster 7 does not reach a specific minimum value at the time of return of accelerator lever 17 which results in contact 29 being made, spring 11 will urge diaphragm 10 in diaphragm switch 8 into a position in which make contact 13 connects the lines 32 and 33. Current will then flow through the coil of solenoid-actuated final control element 34, causing pin 35 to move and throttle blade 2 to close pipe 1 by its abutment on stops 3 and 3'. Since pipe 1 is now closed, a high amount of vacuum will be generated in fractions of tenths of a second in pipe 1 and brake booster 7 as a result of the induction effect of the engine. When the vacuum reaches the switch point of diaphragm switch 8, make contact 13 will interrupt the circuit as a result of which throttle blade 2 will reopen the passage. Since this process occurs in fractions of tenths of a second, make contact 13 opens earlier than make contact 29.

In FIG. 3, a pipe 1 of an engine induction or intake system includes a pivoted throttle blade 2 which is coaxial with pipe 1 in its first position and abuts against stops 3 and 3' in pipe 1 in its second position. Between throttle blade 2 and an engine (not shown in the drawing), pipe 1 includes a port 4 for a vacuum conduit 5 whose opposite end is connected to a port 6 of a brake booster 7. Throttle blade 2 is moved by a solenoid-actuated final control element 34 by means of a pin 35. Lines 41 and 42 connect solenoid-actuated final control element 34 with an electronic control unit 43 which may comprise an analog or a digital computer. Control unit 43, which is connected to an electrical power source 30, includes a plurality of connectors to which several sensors delivering an electrical signal responsive to the measured value may be connected. A first sensor 44 senses the vacuum prevailing in the vacuum conduit 5. A second sensor 45 serves to sense the accelerator lever's return speed. Further sensors 46, 47 and 48 are provided to detect further engine and vehicle-related data, delivering corresponding signals to control unit 43. The following quantities are suitable of being sensed, for example: Engine speed, engine acceleration, engine deceleration, vehicle speed, accelerator pedal position, brake pedal position, etc.

The mode of operation of the device of FIG. 3 is described as follows:

Sensor 44 senses the vacuum prevailing in vacuum conduit 5 or in brake booster 7, respectively, issuing a corresponding signal to control unit 43. The sensors 45, 46, 47 and 48 sense their appropriate quantities and deliver signals corresponding to the measured quantities to control unit 43. Control unit 43 computes the period of time favorable for vacuum generation from all the signals presented to it. If the conditions for vacuum generation without impairing the running of the engine or of the vehicle are fulfilled, control unit 43 actuates solenoid-operated final control element 34, and throttle blade 2 closes pipe 1 by its abutment against stops 3 and 3'. With pipe 1 closed, the engine's induction effect in pipe 1 and in brake booster 7 results in the generation of a high amount of vacuum within fractions of tenths of a second. Thus, if the conditions for closing of throttle blade 2 are fulfilled, throttle blade 2 will be closed for only a short period of time.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for generating and making available a vacuum for an auxiliary power system of a vehicle comprising:
    at least one throttle disposed in an intake system of an internal combustion engine;
    a vacuum conduit having one end connected to said auxiliary power system and the other end connected to said intake system between said throttle and said engine;
    first means coupled to said conduit to produce a first response when the vacuum has achieved at least a predetermined value;
    second means coupled to respond to at least one other operating state of one of said engine and said vehicle and to produce a second response dependent on said operating state; and
    third means coupled to said first and second means and said throttle to control said throttle in response to said first and second responses.

2. An arrangement according to claim 1, wherein said throttle is disposed between a carburetor and said engine.

3. An arrangement according to claim 1, wherein said third means includes
    a control element coupled to said throttle for final control thereof.

4. An arrangement according to claim 3, wherein said control element includes
    a solenoid-operated control element having a winding.

5. An arrangement according to claim 4, wherein said first means includes
    a vacuum responsive first electrical switch having one terminal coupled to one terminal of said winding,
    said second means includes
    a second electrical switch responsive to said operating state having one terminal coupled to the other terminal of said first switch and its other terminal coupled to one terminal of an electrical power source, and
    said winding has its other terminal coupled to the other terminal of said power source.

6. An arrangement according to claim 5, wherein said second means responds to the return speed of an accelerator pedal.

7. An arrangement according to claim 6, wherein said second means further includes
    a liquid-filled cylinder,
    means connected to said cylinder to control said second switch,
    a piston disposed in said cylinder rigidly connected to said pedal,
    a spring disposed in said cylinder acting on said piston in a direction toward said pedal, and
    a throttle valve and a check valve disposed in said piston to allow passage of said liquid during forward movement of said accelerator pedal, said check valve blocking and said throttle valve throttling passage of said liquid during reverse movement of said accelerating pedal resulting in movement of said cylinder toward said accelerating pedal to close said second switch.

8. An arrangement according to claim 4, wherein said first means includes
   a vacuum sensor coupled to said conduit to produce said first response as a first electrical signal,
said second means includes
   a plurality of sensors each responding to a different one of engine and vehicle-related data, such as accelerator pedal return speed, engine speed, engine acceleration, engine deceleration, vehicle speed, accelerator pedal position and brake pedal position, and producing a second electrical signal indicative of said operating state of an associated one of said data, and
said third means includes
   an electronic control circuit coupled to said winding and each of said sensors responding to said first signal and each of said second signals to control said solenoid-operated control element.

9. An arrangement according to claim 1, wherein said second means responds to the return speed of an accelerator pedal.

* * * * *